United States Patent [19]
Hsiao

[11] Patent Number: 6,112,790
[45] Date of Patent: Sep. 5, 2000

[54] PUNCTURE-DURABLE TIRE STRUCTURE

[75] Inventor: Chai-I Hsiao, Chang-Hua Hsien, Taiwan

[73] Assignee: Taiwan Kings Glory Co., Ltd., Chang-Hua Hsien, Taiwan

[21] Appl. No.: 09/268,733

[22] Filed: Mar. 17, 1999

[51] Int. Cl.$^7$ .............................. B60C 5/00; B60C 5/12; B60C 9/08; B60C 15/00; B60C 19/12

[52] U.S. Cl. .................... 152/503; 152/502; 152/510; 152/549

[58] Field of Search ...................... 152/503, 549, 152/510, 502, 504, 505, 508; 156/115

[56] References Cited

U.S. PATENT DOCUMENTS 4,919,183  4/1990  Dobson ............................ 152/503 X

*Primary Examiner*—Adrienne C. Johnstone

*Attorney, Agent, or Firm*—Bacon & Thomas

[57] ABSTRACT

A puncture-durable tire structure has a tire body which is covered with an outer radial ply at the inner side thereof. The outer radial ply is made up of an inner layer and an outer layer that are respectively extended over the bead wires at the edges of the tire body and further extended to a middle position of a rubber side wall of the tire body. The inner side of the outer radial ply is in abutment with an airtight layer which is in turn in abutment with a leakage-proof layer. The leakage-proof layer is further covered with an inner radial ply which has an inner layer and an outer layer. The outer layer of the inner radial ply extends to a tire lip portion of the tire body and the inner layer of the inner radial ply is led over and wound around the bead wires at the tire body and further extends to the upper portion of the rubber side wall. By way of the integral structure of the tire, the tire has a reinforced rubber side wall, and the air inside the tire can be prevented from easily leaking out when the tire is punctured, and the punctured tire can seal by itself so as to improve the driving safety.

1 Claim, 4 Drawing Sheets

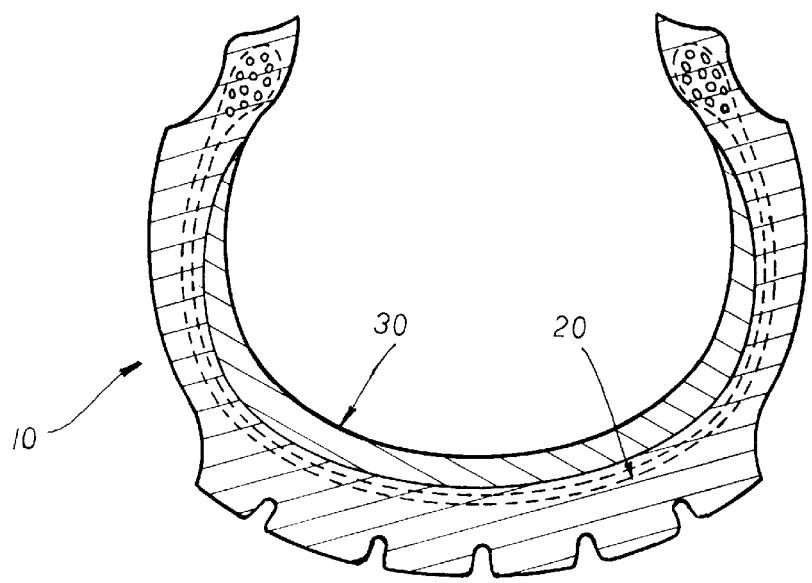
FIG. 1 PRIOR ART
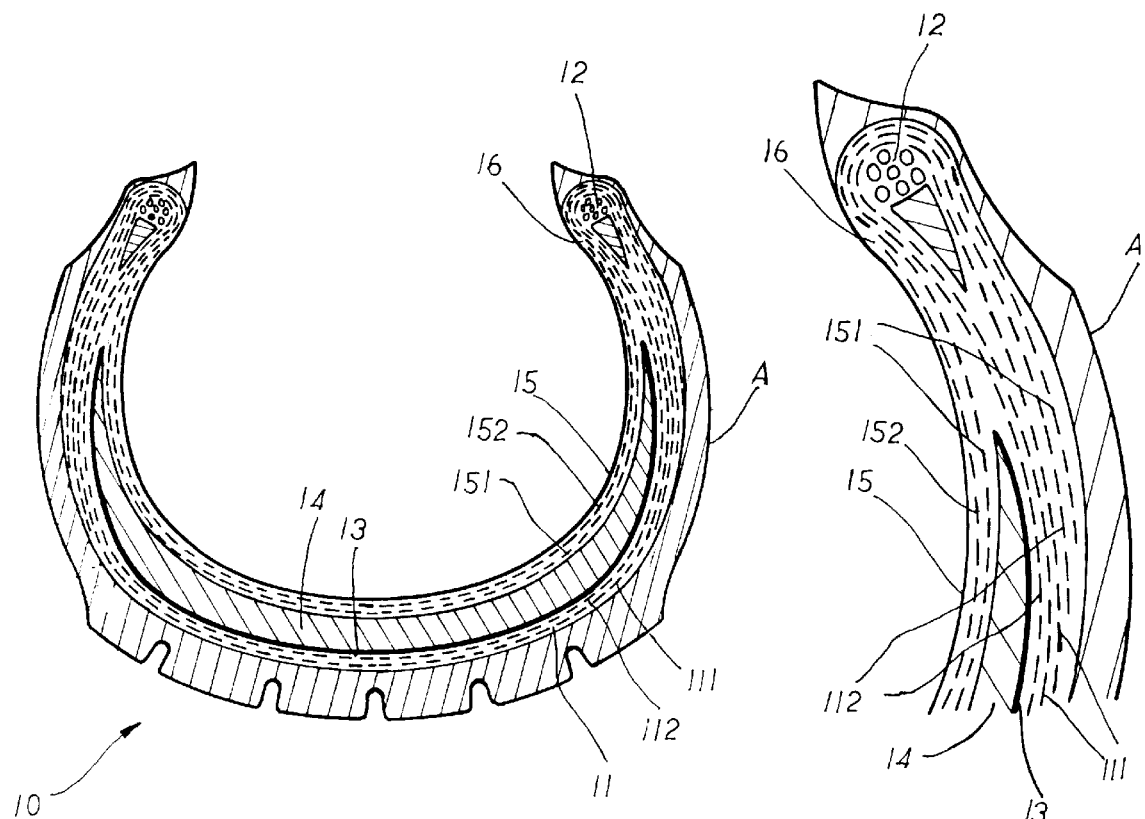
FIG. 2
FIG. 3

PUNCTURE-DURABLE TIRE STRUCTURE

FIELD OF THE INVENTION

The present invention relates to an integrally molded tire which is not apt to deform dangerously on the rubber walls when the tire is subject to low inner pressure. In addition, when the tire of the present invention is punctured by a pointed object, the air in the tire is not easily leaked out so as to improve the operational safety of a tire.

BACKGROUND OF THE INVENTION

In general, a conventional puncture-durable tire has a structure as shown in FIG. 1. It is structured to have a tire body 10 embedded with filament reinforcing elements 20, on the inside top of which is covered with a PVC layer 30 in a secondary treatment in a production process. The PVC layer 30 is added in mixture with a DOP oily chemical in the secondary treatment so as to make the tire not apt to leak when it is punctured by a pointed object.

Such a prior art tire has the following disadvantages:

1. The rubber side walls of such a tire is relatively weak to protect the tire from deformation on the side walls when the tire is not filled with enough air, resulting in driving jeopardy.

2. The PVC layer 30 produced in the secondary treatment during production will easily become hardened and chapped or peeled off the tire because of a centrifugal force resulted from the spinning of a tire. Thus, the gravity center of the tire is shifted in operation, causing danger in driving.

3. The surface of the PVC layer 30 becomes oily and sticky as a result of addition of the DOP chemicals, and it prevents a punctured tire from being patched with ease.

SUMMARY OF THE INVENTION

Therefore, the primary object of the present invention is to provide a reinforced tire structure having stronger rubber side walls that are not easily deformed when the tire is not filled with enough air so that the driving safety of a vehicle can be improved.

Another object of the present invention is to provide a reinforced tire structure which has a tire body which is covered with an outer radial ply at the inner side thereof, the inner side of the outer radial ply is in abutment with an airtight layer which is in turn in abutment with a leakage-proof layer which is covered with an inner radial ply. The airtight layer and the leakage-proof layer are integrally wrapped around by the outer radial ply and the inner radial ply whereby such a tire has a better balance and stability.

One further object of the present invention is to provide a reinforced tire structure which can be protected from leakage when it is punctured by a pointed object as a result of the pointed object being wrapped around by the airtight layer and the leakage proof layer, and as the pointed objected is pulled out, the air tight layer and the leakage proof layer will cover the punctured hole so as to prevent the tire from sudden loss of air which will cause instant shift of center of gravity. Thus, driving safety can be effectively improved.

BRIEF DESCRIPTION OF THE DRAWINGS

FIG. 1 is a sectional view of a prior art tire structure;

FIG. 2 is a sectional view showing the structure of the present invention;

FIG. 3 is an enlarged view of a portion of FIG. 2;

DETAILED DESCRIPTION OF THE PREFERRED EMBODIMENT

Figure 4:
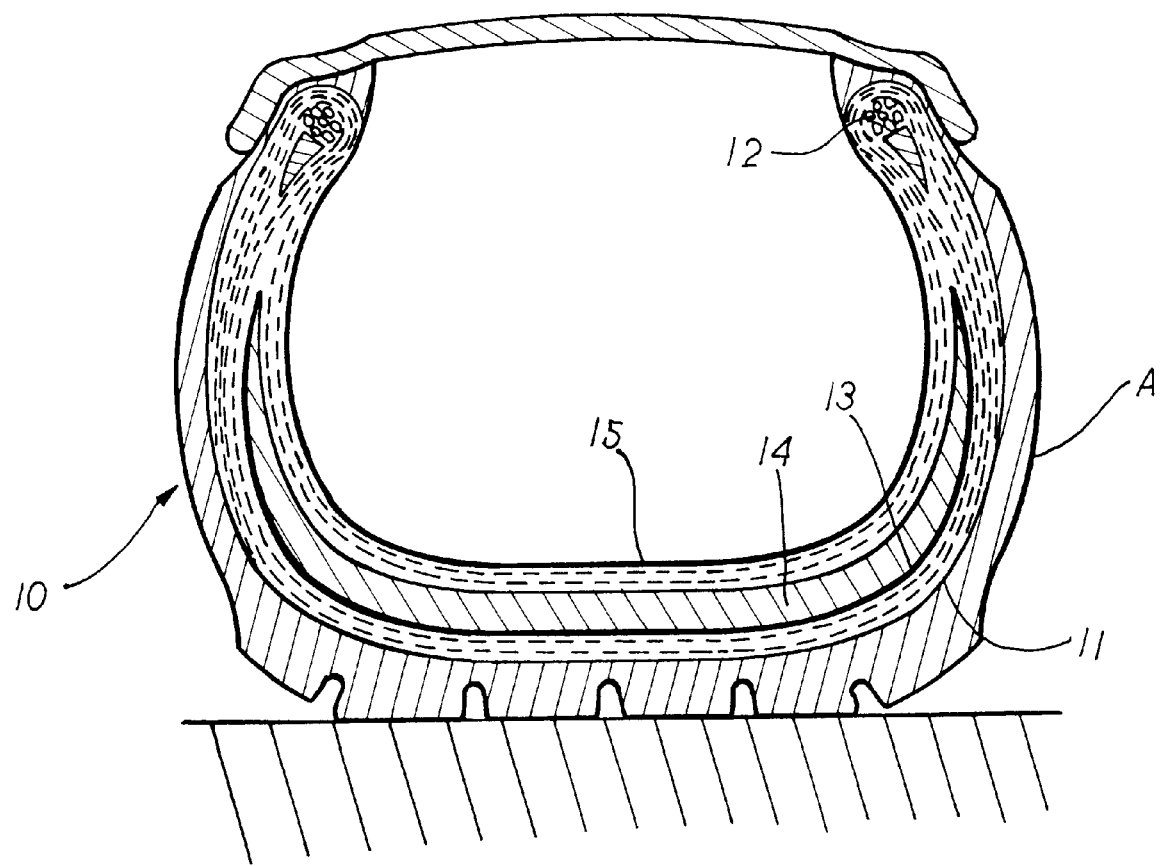
FIG. 4 is a sectional view showing the tire under a non-sufficient pressure state.

Referring to FIGS. 2, 3, the tire of the present invention is made up of a tire body 10 and an outer radial ply 11 disposed at the bottom of the tire body 10. The outer radial ply 11 is comprised of an inner layer 112 and an outer layer 111. The inner layer 112 extends and is wound around bead wires 12 disposed at each edge of the tire body 10 and further extends to a middle position of a rubber side wall A. The outer radial ply 11 is in abutment with an airtight layer 13 which in turn is in abutment with a leakage proof layer 14. The leakage proof layer 14 is further covered with an inner radial ply 15 so as to permit the airtight layer 13 and the leakage proof layer 14 to be sandwiched between the outer radial ply 11 and the inner radial ply 15.

The inner radial ply 15 is made up of an inner layer 152 and an outer layer 151 which extends to a tire lip portion 16 of the tire body 10 and the inner layer 152 is led over and is wound around the bead wires 12 and further extends to an upper position of the rubber side wall A.

It can be apparently seen that the present invention has the following advantages in practical use:

1. The rubber side wall A of each tire made up of a plurality of radial plies are reinforced effectively, preventing a tire from being easily deformed when the pressure in the tire is low, so as to improve driving safety, as shown in FIG. 4 in which a tire without enough air pressure is illustrated in a plane view.

2. The airtight layer 13 and the leakage-proof layer 14 wrapped around by the outer radial ply 11 and the inner radial ply 15 are integrally formed so that the tire has a better balance and stability in practical use and the layers are not apt to peel off due to centrifugal force.

Figure 5:
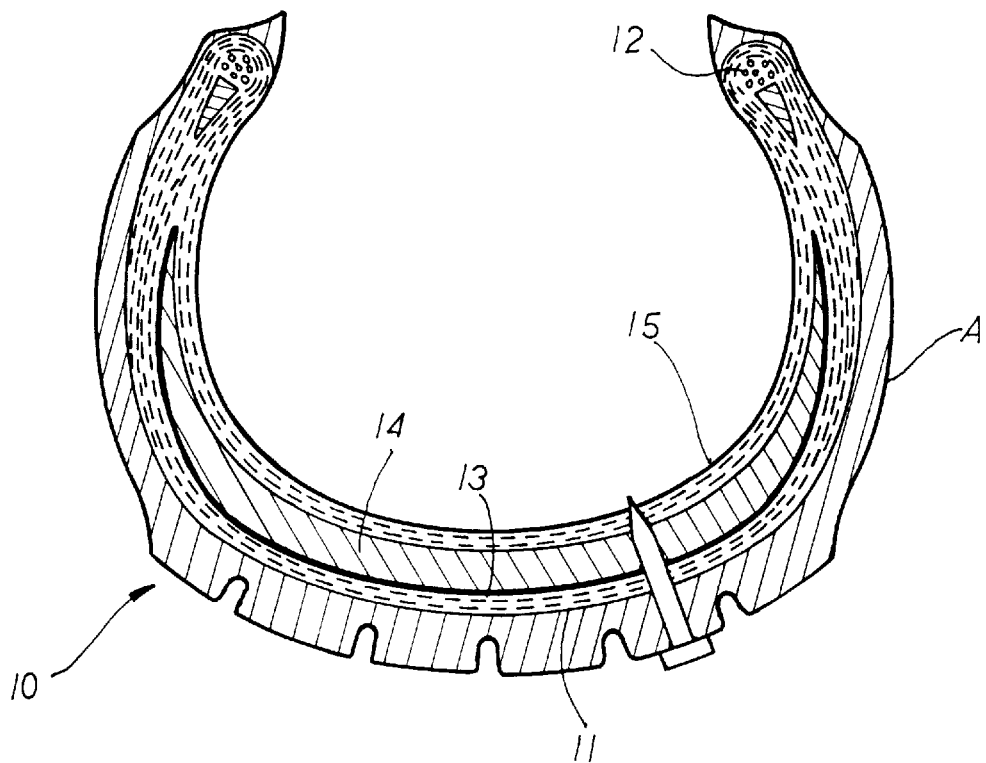
FIG. 5 is a sectional view showing the tire of the present invention being pierced by a pointed object.
Figure 6:
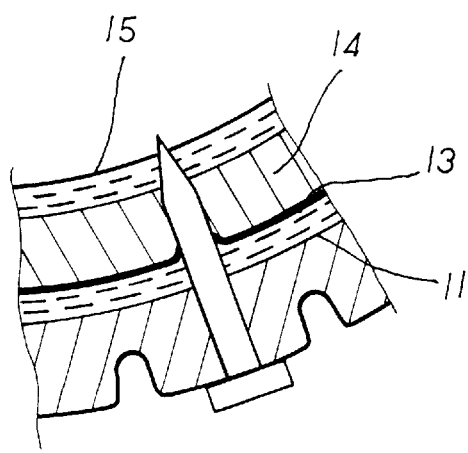
FIG. 6 is an enlarged view of a portion of FIG. 5.
Figure 7:
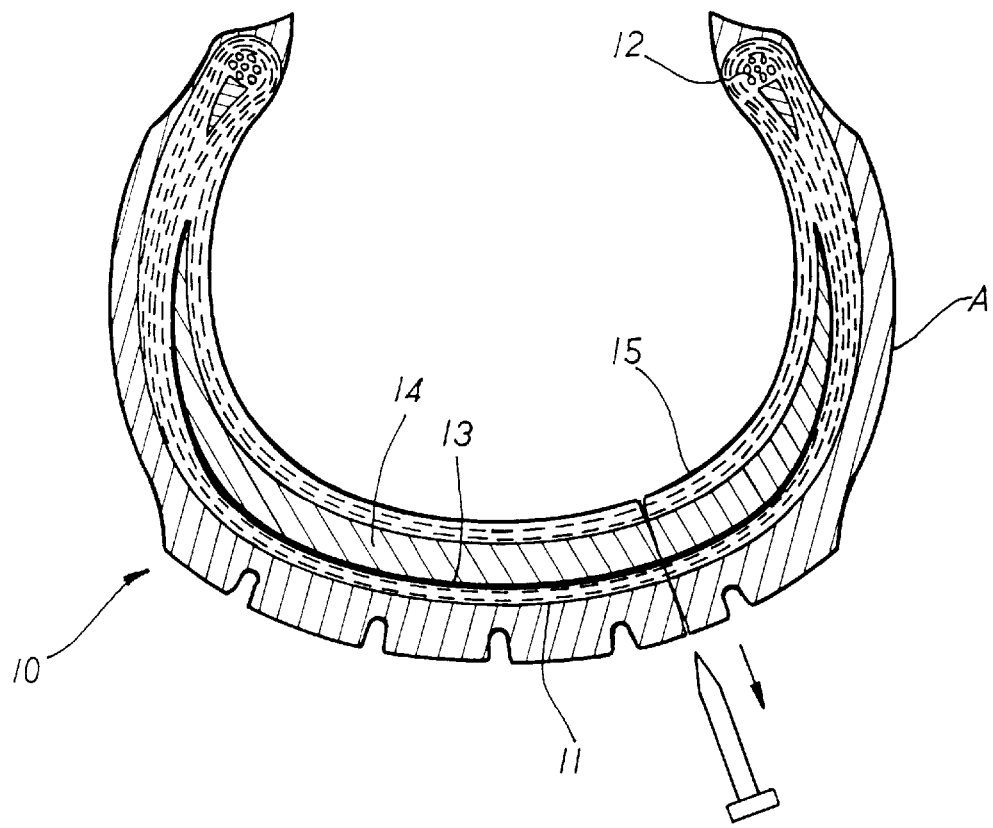
FIG. 7 is a sectional view showing a pointed object piercing into a tire being removed.
Figure 8:
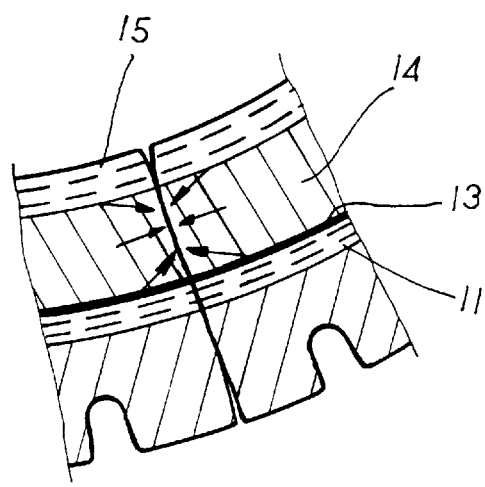
FIG. 8 is an enlarged view of a portion of FIG. 7.

3. As the tire is punctured by a pointed object, the airtight layer 13 and the leakage-proof layer 14 can wrap around the pointed object, preventing the air in the tire from leaking out and thus enhancing driving safety; as shown in FIGS. 5 and 6. When the pointed object is pulled out, the airtight layer 13 and the leakage-proof layer 14 will automatically seal the punctured hole so as to prevent the air from leaking out of the punctured hole, as shown in FIGS. 7 and 8.

The above preferred embodiment is only an example for illustration of the structure of the tire of the present invention and should not be limited as the scope of the present invention. Any modifications and changes based on the following claims should all fall into the scope of the present invention.

What is claimed is:

1. A puncture-durable tire structure for use on vehicles being characterized in that:

said tire structure having a tire body which being covered with an outer radial ply at an inner side thereof, said outer radial ply being made up of an outer layer and an inner layer that being extended and wound around bead wires at each edge of the tire body and further extended to a middle position of a rubber side wall of the tire body, an inner side of said outer radial ply being in abutment with an airtight layer which in turn being in abutment with a leakage-proof layer, said leakage-proof layer being further covered with an inner radial ply which has an inner layer and an outer layer; said outer layer of the inner radial ply extending to a tire lip portion of the tire body, and said inner layer of the inner radial ply being led over and wound around said bead wires, and further extending to an upper portion of said rubber side wall of of said tire body, whereby said tire body has a reinforced side wall, the air inside the tire can be prevented from easily leaked out when the tire is punctured, and the punctured tire can seal by itself, rendering an improved driving safety.

* * * * *